United States Patent [19]
Huck

[11] Patent Number: 5,970,230
[45] Date of Patent: Oct. 19, 1999

[54] APPARATUS AND METHOD FOR CREATING A VIRTUAL CHANNEL ON A NETWORK OF COMPUTERS

[76] Inventor: Mark M. Huck, 1026 32nd Ave. East, Seattle, Wash. 98112

[21] Appl. No.: 08/840,983

[22] Filed: Apr. 21, 1997

[51] Int. Cl.⁶ .................................................. G06F 13/14
[52] U.S. Cl. .............................. 395/200.54; 395/200.09
[58] Field of Search ................. 607/72, 45; 395/200.57, 395/200.48, 200.75, 200.49, 200.59, 200.33, 200.12; 348/473; 707/501

[56] References Cited

U.S. PATENT DOCUMENTS

| | | |
|---|---|---|
| 5,448,738 | 9/1995 | Good et al. . |
| 5,574,837 | 11/1996 | Clark et al. . |
| 5,717,860 | 2/1998 | Graber ................................ 395/200.57 |
| 5,752,979 | 5/1998 | Benabid ..................................... 607/72 |
| 5,774,666 | 6/1998 | Portuesi .............................. 395/200.48 |
| 5,784,565 | 7/1998 | Lewine ................................ 395/200.59 |
| 5,812,769 | 9/1998 | Graber et al. ....................... 395/200.57 |

Primary Examiner—Zarni Maung
Assistant Examiner—Khanh Quang Dinh

[57] ABSTRACT

In a network of computers, typically based on TCP/IP protocol, a method and apparatus which dynamically creates a visual group—a channel—of links to Referring URLs within the Destination URL appearing in the operator's screen of the operator's display

3 Claims, 3 Drawing Sheets

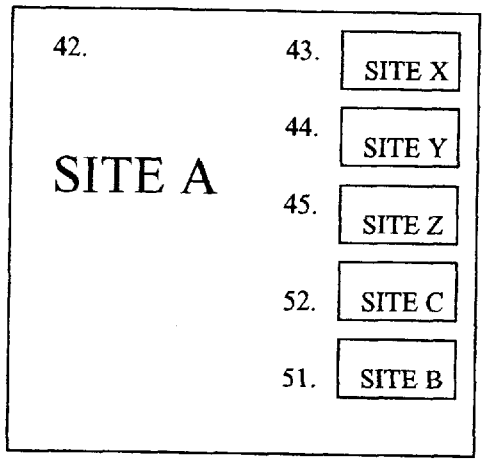
Fig. 3a
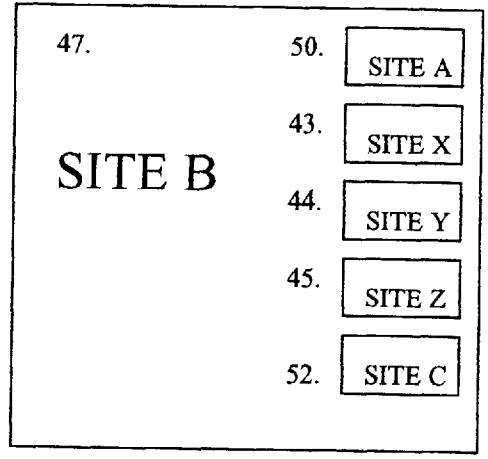
Fig. 3b
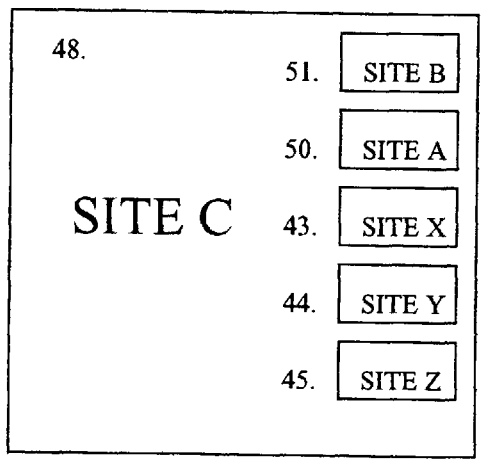
Fig. 3c
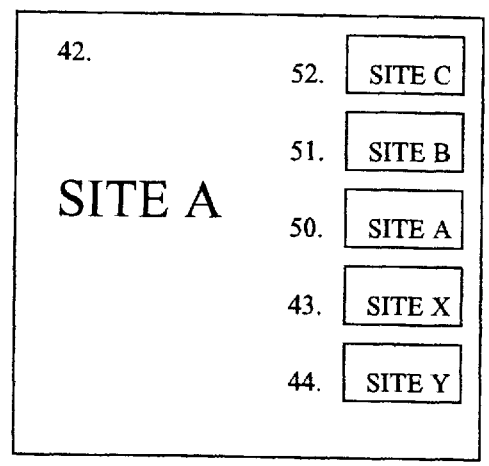
Fig. 3d
Figs. 3a - 3d

APPARATUS AND METHOD FOR CREATING A VIRTUAL CHANNEL ON A NETWORK OF COMPUTERS

BACKGROUND OF THE INVENTION

1. Field of the Invention

This invention relates to computer systems, particularly to such systems designed and programmed to operate on a network.

2. Description

The internet and other networks based on TCP/IP protocols permit computer operators linked to a network where the computers use programs known as "browsers" to navigate among separate and distinct World Wide Web (WWW) pages hosted by other computers, each WWW page having a distinct Uniform Resource Locator (URL) and communicating via the Hypertext Transfer Protocol (HTTP) and other protocols. These computer operators can instruct their browsers to move among these WWW pages ("navigate") by hand typing a URL into the browser's command line or by selecting an image or text which then directs the user's computer to the WWW page associated with that text or image.

Having navigated from one WWW page (the "Referring Page") to another WWW page (the "Destination Page"), the computer operator may then return to the Referring Page by using the favorites or history lists, or back button, provided by the browser program. These are commonly used methods for the operator to navigate among WWW pages on the internet or other network. Some WWW pages on the internet have joined in cooperative "rings" to assist the operator's navigation while encouraging the operator to visit only those WWW pages within the ring. Links between these WWW pages are hard-coded; these WWW pages do not dynamically pass information to other WWW pages in the ring based upon the operator's prior navigation. The operator is locked into the ring, prevented from flexible navigation based on the user's prior navigation preferences. Information specific to the Referring Page does not dynamically appear on the screen together with the Destination Page after the operator has navigated to the Destination Page.

Some WWW sites on the internet show ways in which a site may be customized for incoming visitors, but do not provide for dynamic links back to referring pages. For example, the http://www.broadvision.com and http://www.1to1marketing.com sites and others describe methods for presenting information based on an individual user's preferences. However, neither these sites nor any other site currently describe a method for drawing information from or about the Referring Page's URL into the Destination Page for display on the operator's screen as the operator's browser loads the Destination Page.

While U.S. Pat. No. 5,448,738 to Good, et al. (1995) discloses a method for transferring information between computers, it does not describe a method for identifying the Referring URL and then using this information to provide further information to the operator even after the operator has navigated to the Destination Page. U.S. Pat. No. 5,574, 837 to Clark et al. (1996) describes passing code segments between computers, but does not describe pulling information from a Referring URL into the information of a Destination Page then sent to the operator's computer and computer monitor.

No method has been described, then, which provides a dynamic, visual representation of Referring URLs within the main screen of the operator's browser (i.e., not contained within the lists or back button described above) as the operator views the Destination Page on her screen.

The present invention provides an apparatus and method to provide this dynamic, visual representation of the Referring Page as the operator views the Destination URL on the computer screen. Two examples of the present invention are illustrative:

In the first example, as the operator navigates from the Referring Page to the the Destination Page the present invention directs the operator's browser to a program which, prior to showing the Destination Page on the operator's screen, incorporates information about the Referring Page within the screen that will display the Destination Page to the operator, thereby continuing to present information about the Referring Page within the operator's field of view.

In the second example, HTTP headers automatically passed by the Referring Page to the Destination Page are used by the present invention to dynamically display the Referring Page's information on the Destination Page. These headers contain information about the operator including, for example, the operator's browser type (through HTTP_USER_AGENT) and the operator's originating URL (through HTTP_REFERER). While mainly designed to coordinate the flow of information between sites, these headers are also used to log information about incoming operators to the Destination Page; for example, to identify the incoming operators' browsers in order to prepare the Destination Page for viewing by that type of brower through USER_AGENT or to receive query information being passed by a header through QUERY_STRING. The query strings may specify operator information which can then be manipulated by the Destination Page. HTTP headers, then, have been used hitherto to collect information and to prepare the Destination Page for the operator. No method has been described, however, which uses these headers to identify the incoming operator for the purpose of then retrieving further information from the Referring URL in order to incorporate Referring Page information within the Destination Page's information passed back to the operator's browser. Hitherto, navigating between internet sites has not allowed for dynamic navigation between a Referring Page and a Destination Page.

While prior art does show cooperation among sites as well as computers manipulating HTTP headers, nevertheless prior art heretofore suffers from a number of disadvantages:

(a) The Referring Page is lost in the operator's field of view as the operator navigates to the Destination Page.

(b) The operator does not see a dynamic list of visited sites on operator's screen.

(c) In effect, then, the Referring Page is penalized for have links out to other sites, since the operator does not receive any encouragement to return other than through the operator's own memory of the Referring Page or through an active search of the history or favorites list.

(d) The operator cannot customize a series of Referring Pages—a channel—which has been dynamically created based on the operator's actual navigation patterns.

(e) Commercial sites are discouraged from allowing operators to browse, since the probability of the operator returning to the Referring Page are diminished if the Referring Page is out of the operator's field of view.

SUMMARY OF THE INVENTION

Accordingly, the objects and advantages of the present invention are:

(a) to provide a method and apparatus which allows visual or other detailed information from a Referring Page to appear on the operator's screen even after the operator has navigated to a Destination Page.

(b) to provide a method and apparatus which allows a group of cooperating sites to pass dynamically generated information to the operator based on the Referring Page the operator has visited but left.

(c) to provide a method and apparatus for a very large group of cooperating sites to advertise at each other's sites by dynamically permitting the Referring Page and Referring Pages prior to the present Referring Page to appear on the operator's screen.

(d) to provide a method and apparatus for creating a virtual channel; that is, a dynamically created group of sites cooperating by virtue of the operator's preferences.

Further objects and advantages are to provide a method for the operator to then customize her preferences as the group is dynamically created. Still further objects and advantages will become apparent from a consideration of the ensuing description and drawings.

BRIEF DESCRIPTION OF THE DRAWINGS

FIGS. 3A, 3B, 3C, and 3D show the operation of the invention.

DETAILED DESCRIPTION OF THE PREFERRED EMBODIMENTS

Figure 1:
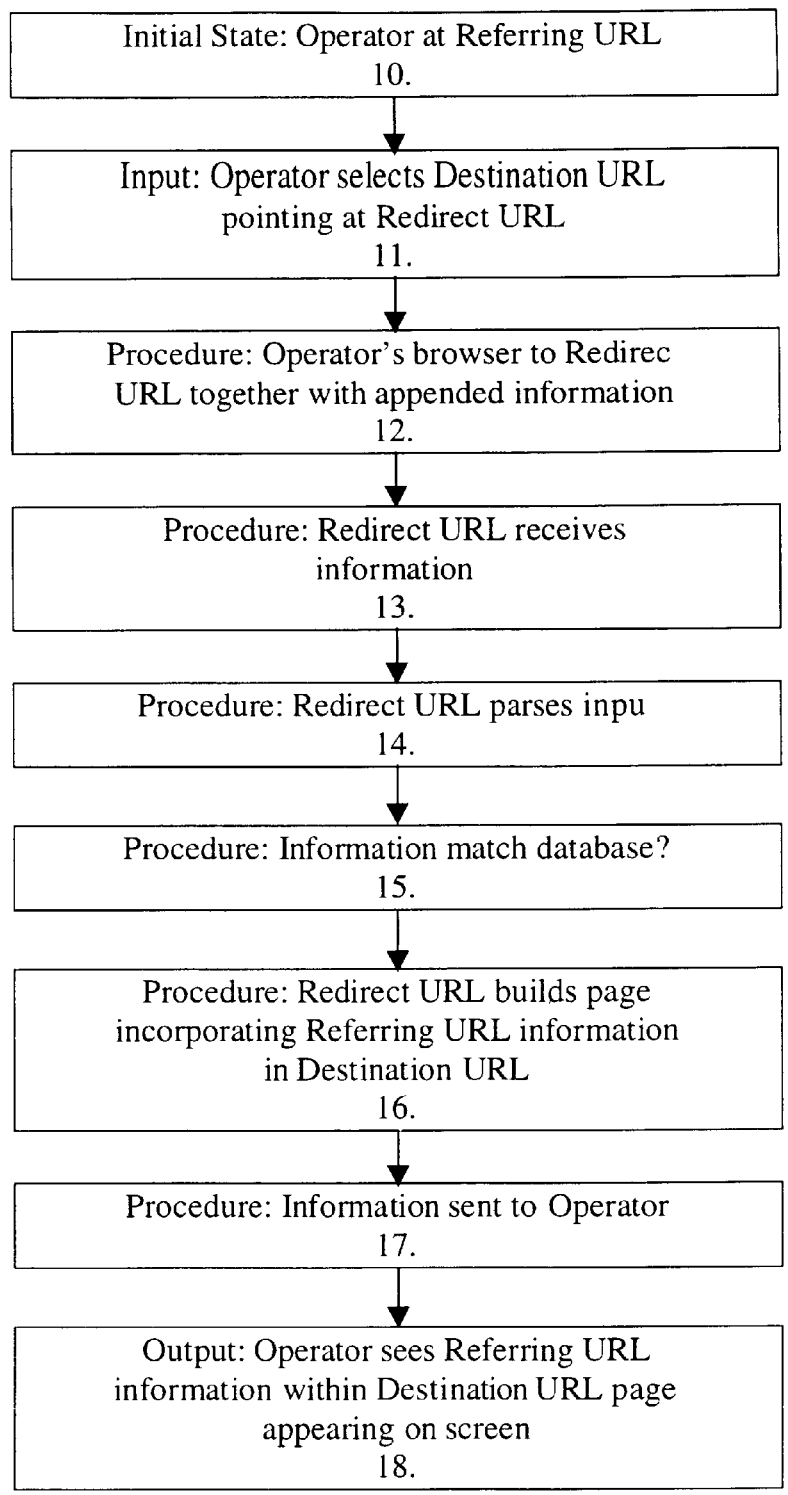
FIGS. 1 and 2 are general flow-charts of the invention.
Figure 2:
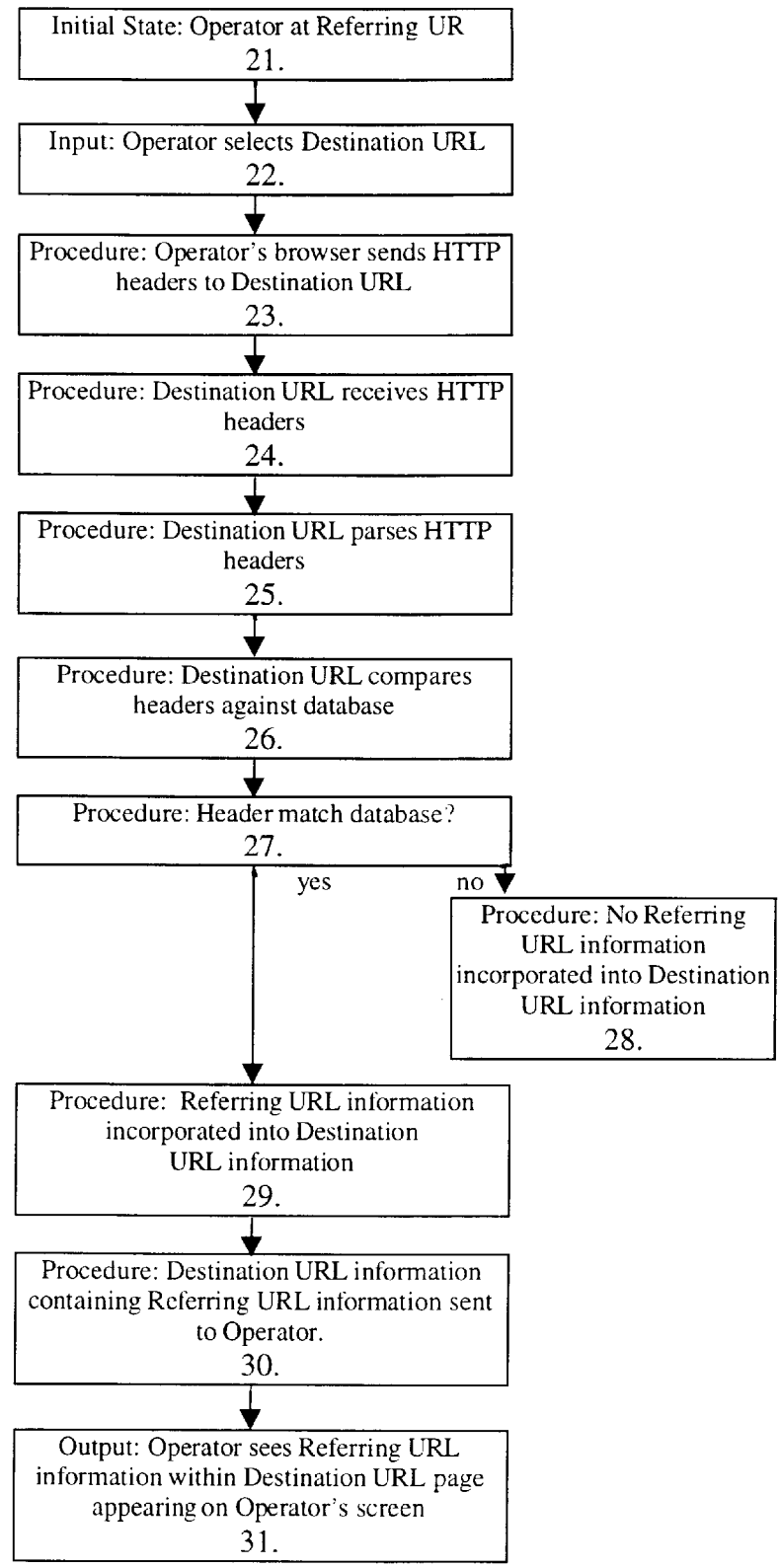

A description of the present invention is shown in the flow-charts of FIG. 1 and FIG. 2.

In FIG. 1, a computer operator has an initial state 10 where the Referring Page is present in the browser on her screen. The operator initiates procedures 12 through 18 by providing input 11, typically by clicking on an image or words indicating that she will be directed to the Destination Page.

A procedure 12 redirects the operator's browser to the computer memory storing procedures 13 through 17.

A procedure 13 receives the HTTP headers and any appended input from the operator's browser. This input is then parsed by a procedure 14.

A procedure 15 compares the values with database values to determine the values to return as well as to log any input from operator.

A procedure 16 builds a page incorporating images or text associated with the Referring Page into a smaller window on the page, and loads the Destination Page into the main window of the page.

A procedure 17 returns the page to the operator's computer, and a procedure 18 displays the page on the operator's screen.

In FIG. 2, a computer operator has an initial state 21 where the Referring Page is present in the browser on his screen. The operator initiates procedures 23 through 31 by providing input 22, typically by clicking on an image or words indicating that he will be directed to the Destination Page.

A procedure 23 in the browser (shown in prior art) creates HTTP headers, including HTTP_REFERER, to send to Destination Page.

A procedure 24 at destination Page receives the HTTP headers (prior art) and any appended input from the operator's browser. This input is parsed by a procedure 25.

A procedure 26 compares the values, or a substring of the values, with database values, or a substring of the values.

A procedure 27 determines whether a match exists. If not, a procedure 28 returns a default value and no Referring Page information is incorporated in the page returned to operator's computer (Destination Page).

If a match exists, a procedure 29 builds a page incorporating images or text associated with the Referring Page into a smaller window on the page, and loads the Destination Page into the main window of the page.

A procedure 30 returns the page to the operator's computer, and a procedure 31 displays the Destination Page on the operator's screen.

OPERATION OF THE INVENTION

The operation of the invention is shown in FIGS. 3a–3d, each of which shows a computer screen appearing to the operator. FIGS. 3a–3d should be taken together with FIGS. 1 and 2.

Screen 42 shows information for Site A as well as smaller windows 43, 44, 45, 51 and 52 containing information about sites X, Y, Z, C and B, respectively. If the operator clicks on the window 51 (site B), for example, the underlying procedures 11 through 18, as described in FIG. 1 above, or 23 through 31, as described in FIG. 2 above, return a screen 47 to the operator's screen.

FIG. 3b shows the resulting computer screen 47 with information for site B displayed on the operator's screen. Referring site A is represented in a window 50, while windows 43, 44, 45, and 52, representing sites X, Y, Z and C, respectively, have dropped lower on the screen 47. If the operator clicks on the window 52 (site C), for example, the underlying procedures 11 through 18, as described in FIG. 1 above, or 23 through 31, as described in FIG. 2 above, return a screen 48 to the operator's screen.

FIG. 3c shows a resulting computer screen 48 with information for site C displayed on the operator's screen. Referring site B is represented in a window 51, while windows 50, 43, 44, 45, and 52, representing sites A, X, Y, and Z, respectively, have dropped lower on the screen 48. If the operator clicks on the window 50 (site A), for example, the underlying procedures 11 through 18, as described in FIG. 1 above, or 23 through 31, as described in FIG. 2 above, return a screen 42 to the operator's screen.

FIG. 3d shows a resulting computer screen 42 with information for site A displayed on the operator's screen. Referring site C is represented in a window 52, while windows 51, 50, 43, 44, 45, and 52, representing sites B, A, X, and Y, respectively, have dropped lower on the screen 42. If the operator now clicks on any of the windows 52, 51, 50, 43, or 44, the underlying procedures 11 through 18, as described in FIG. 1 above, or 23 through 31, as described in FIG. 2 above, return the respective screen to the operator's display.

CONCLUSIONS, RAMIFICATIONS, AND SCOPE

Accordingly, the reader will see that this invention provides a highly functional method for improving navigation on an internet or intranet by dynamically creating a group of visual links to sites the operator has previously visited.

Although the description above contains many specificities, these should not be construed as limiting the scope of the invention but as merely providing illustrations of some of the presently preferred embodiments of this invention. For example, the invention could allow for further customization of the listing of Referring Pages, as well as for the categorizing the Referring Pages by type.

Thus, the scope of the invention should be determined by the appended claims and their legal equivalents, rather than by the examples given.

I claim:

1. A method for transferring file information in a computer network comprising
   (a) providing a memory which is able to store incoming information received over a network in said memory,
   (b) providing a processor,
   (c) providing such network devices necessary to connect to a network of computers,
   (d) providing a display which is operatively connected to such memory,
   (e) providing a browser program able to transfer and receive HTTP information, placing such information in memory in a way available to the processor, and showing information on said display,
   (f) providing a character input means which a human operator can user to enter information into said browser, and
   (g) providing a pointer or input means which said operator can manipulate to point to a page in a browser display which will direct the browser to load said page and cause information about said page to be loaded by user's computer and shown on said display,
   whereby said method will receive information from browser containing page information to and from which operator is transferring, manipulate said information such that information from previously visited pages is presented within the operator's screen together with the page to which the operator's browser is pointed,
   whereby an operator can view information received from currently visited page which simultaneously contains information from previously visited page or pages.

2. The method in a computer network of claim 1 wherein a procedure prioritizes the display of said page information on operator's screen.

3. A method for transferring file information in a computer network comprising
   (h) providing a memory which is able to store incoming information received over a network in said memory,
   (i) providing a processor,
   (j) providing such network devices necessary to connect to a network of computers,
   (k) providing a display which is operatively connected to such memory,
   (l) providing a browser program able to transfer and receive HTTP information, placing such information in memory in a way available to the processor, and showing information on said display,
   (m) providing a character input means which a human operator can user to enter information into said browser, and
   (n) providing a pointer or input means which said operator can manipulate to point to a page URL in a browser display which will direct the browser to load said page and cause information about said page to be loaded by user's computer and shown on said display,
   whereby said method will receive information from browser containing page URLs to and from which operator is transferring, manipulate said information such that information from previously visited URLs is presented within the operator's screen together with the URL to which the operator's browser is pointed,
   whereby an operator can view information received from currently visited URL which simultaneously contains information from previously visited URL or URLs
   wherein a procedure prioritizes the display of said on operator's screen.

* * * * *